R. McNAMEE. 2 Sheets—Sheet 1.

Assignor to ALLEN, LANE & SCOTT.

Machine for Sizing and Varnishing Paper.

No. 8,407. Reissued Sept. 10, 1878.

WITNESSES

Villette Anderson

W. C. Masi

INVENTOR

Richard McNamee, by E. W. Anderson

ATTORNEY

2 Sheets—Sheet 2.

R. McNAMEE.

Assignor to ALLEN, LANE & SCOTT.

Machine for Sizing and Varnishing Paper.

No. 8,407. Reissued Sept. 10, 1878.

WITNESSES

Villette Anderson.

Walter C. Masi

INVENTOR

Richard McNamee, by E. W. Anderson,

ATTORNEY

UNITED STATES PATENT OFFICE.

RICHARD McNAMEE, OF PHILADELPHIA, PENNSYLVANIA, ASSIGNOR TO ALLEN, LANE & SCOTT.

IMPROVEMENT IN MACHINES FOR SIZING AND VARNISHING PAPER.

Specification forming part of Letters Patent No. 194,453, dated August 21, 1877; Reissue No. 8,407, dated September 10, 1878; application filed August 7, 1878.

*To all whom it may concern:*

Be it known that I, RICHARD McNAMEE, of Philadelphia, State of Pennsylvania, have invented a new and valuable Improvement in Machines for Sizing or Varnishing Paper; and I do hereby declare that the following is a full, clear, and exact description of the construction and operation of the same, reference being had to the annexed drawings, making a part of this specification, and to the letters and figures of reference marked thereon.

Figure 1:
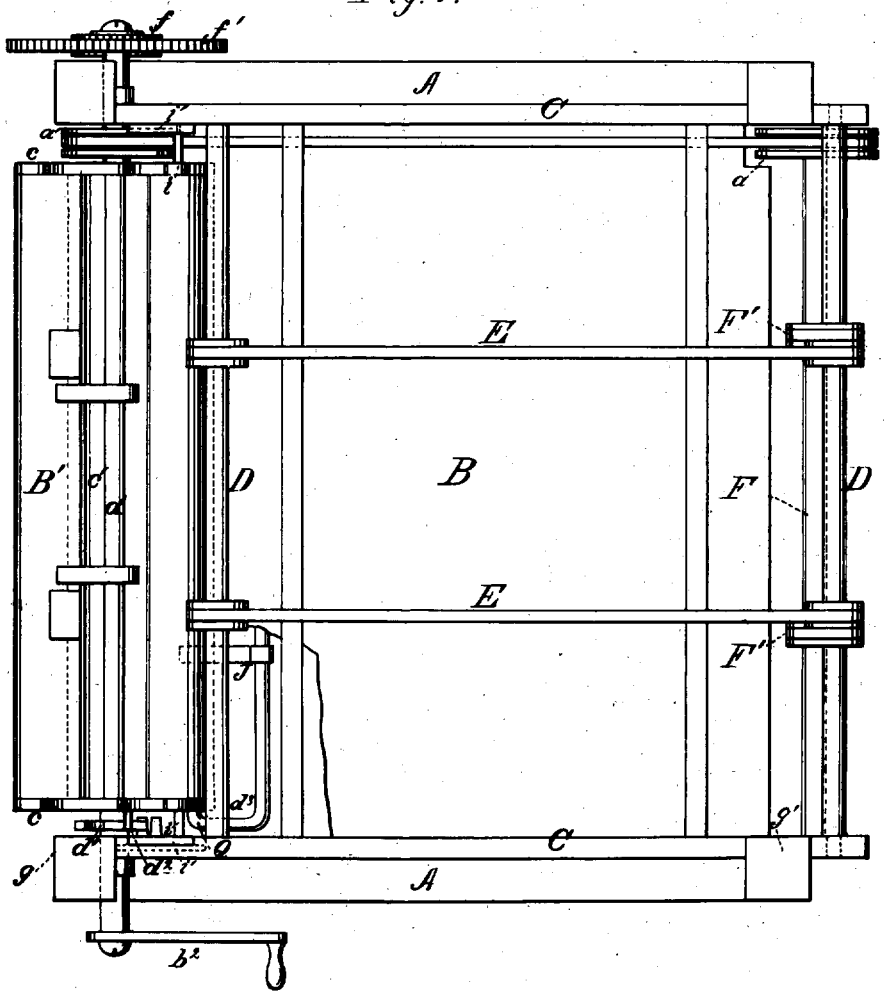
Figure 2:
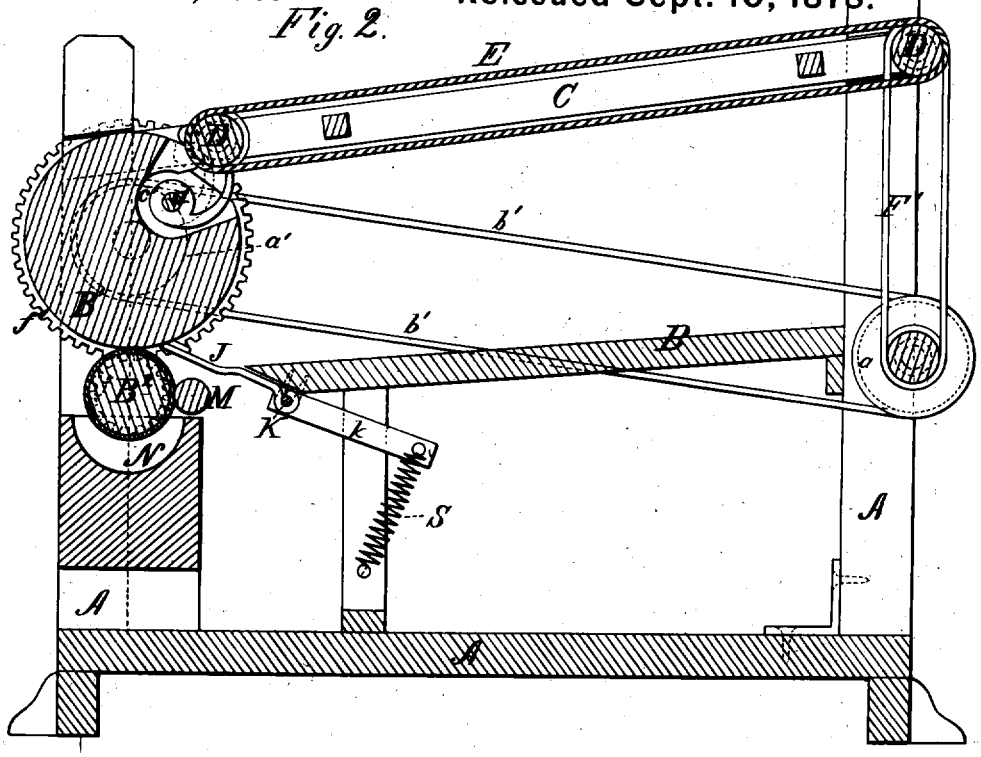
Figure 3:
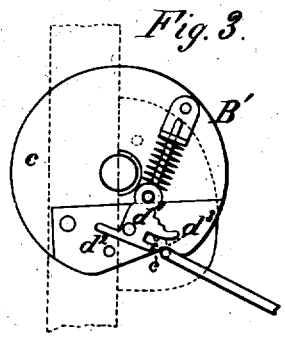
Figure 4:
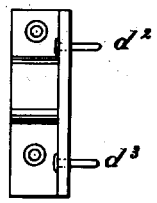
Figure 5:
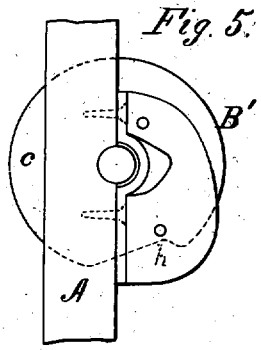

Figure 1 of the drawings is a representation of a top view of my improved machine for sizing or varnishing paper. Fig. 2 is a longitudinal vertical section of the same; and Figs. 3, 4, and 5 are detail views.

This invention has relation to means for sizing or varnishing either plain or printed paper.

Heretofore, in varnishing printed labels, show-cards, and like articles, it has been necessary to apply the size to the surface of the paper, and afterward lay on the varnish with a brush by hand, which is a slow and expensive operation.

It has also been common to apply varnish by means of a cylinder machine, the cylinder working over a flat varnish-bed, which reciprocates underneath the cylinder. This machine delivers the work with the varnished side downward, and is therefore objectionable, for if the varnish is touched after application the surface is spoiled.

The object, therefore, of my invention is to devise a mechanical means for applying the varnish in such a manner that the colors of labels will not run into each other, and therefore dispense with the primary coating of size.

To this end the nature of my invention consists in the combination, with a drum, its gripers, and a varnishing-roller, of feeding and discharging devices, whereby the sheets to be varnished are carried by the drum over the surface of the varnishing-roller and discharged face upward.

It also consists in the combination, with a drum and a varnishing-roller arranged tangential thereto, of a yielding projection at the end of the feed-table to hold the paper up off said roll, as hereinafter more fully set forth.

In the annexed drawings, the letter A designates the frame of my varnishing-machine, which is provided with a feed-table, B, and above the same a discharging-frame, C, which affords bearings for the discharging devices, consisting, in the construction illustrated, of a number of conveyer-tapes, E, passing over transverse shafts D, to which motion is communicated through the medium of belts connecting with the driving-shaft of the machine.

$B^1$ designates the main cylinder, which carries the work. This drum or cylinder, when made of wood, is provided with strong metallic heads *c* and a deep longitudinal groove, *c'*, in which is seated the usual griper-rod *d*, which has its bearings in the heads *c*, and is provided upon one of its ends, which projects through the head, with a dog, $d^1$, the heel of which engages with a spur, $d^2$, projecting inward from the frame, at each complete revolution, thereby rotating the griper-rod and opening the gripers. When the latter are on a level with the feed-table B, the sheet to be varnished having been passed between said gripers and the cylinder $B^1$, the serrated edge of the dog is brought into contact with a second spur, $d^3$, projecting inward from the frame, thereby reversing the action of the griper-rod and causing the gripers to clamp the sheet to the cylinder, so that as the latter continues to revolve said sheet will be carried over the varnishing-roller $B^2$, which is arranged below the cylinder $B^1$ and tangential thereto. This roller $B^2$ is covered with a soft or yielding material, and is supplied with varnish from a trough or fountain, N, below it. It is caused to rotate in unison with the drum $B^1$ by means of a gear-wheel, *f*, which engages a gear-wheel, *f'*, applied upon the end of the drum-shaft. The varnish upon the surface of the varnishing-roll $B^2$ will be applied to the under side of the sheet—that is, the printed side thereof—said sheet being laid upon the feed-table face downward, any excess of varnish being taken up and the varnish being evenly distributed by an auxiliary roller or cut-off, M, which is arranged tangential to the varnishing-roller in bearings in the frame. As the sheet is carried around by the drum the dog of the latter will strike against the spur aforesaid and the gripers will be opened, thereby releasing the sheet at the moment that its front edge is on a level with the discharging-tapes. The sheet will then be discharged from the cylinder with the varnished side upward, and carried by the tapes to the rear end of the apparatus, when it will be taken away to be dried.

In order to prevent the label or sheet as it leaves the feed-table and is seized by the gripers from sagging down upon the varnish-roller $B^2$ and being smirched thereby, a preventive projection, J, is arranged at the end of the feed-table, and extends upward at a suitable inclination toward the cylinder, being journaled to have a movement of vibration at the end of the table, which movement is governed by a cam, *h*, and a controlling-arm, Q, in order that this upholding device or projection shall not bind against the drum and thereby draw the sheet away from the gripers.

Having described my invention, what I claim, and desire to secure by Letters Patent, is—

1. A varnishing-machine having the griping carrying-cylinder $B^1$, and below the same the varnishing-roller and varnish-trough and the feed-table, and above the feed-table, on a level with the upper surface of the cylinder, the discharging-tapes, whereby the work is discharged with the varnish side up, substantially as specified.

2. The combination, in a varnishing-machine, with the upward-carrying cylinder $B^1$ and its feeding and discharging devices, delivering the sheets from the top of the cylinder face upward, of the varnishing-roller, varnish-trough, and cut-off roller, substantially as specified.

3. The combination, in a varnishing-machine, with the carrying-cylinder $B^1$ and its gripers, of the feed-table B, discharging-belt C, varnishing-roller $B^2$, varnish-trough N, and cut-off M, substantially as specified.

4. The combination, in a varnishing-machine, with the varnish-roll and feed-table, of an upholding projection at the end of the feed-table, substantially as specified.

In testimony that I claim the above I have subscribed my name in the presence of two witnesses.

RICHARD McNAMEE.

Witnesses:
JOS. IRWIN,
PRESTON PARR.